April 9, 1957 R. E. MONTIJO, JR 2,788,209

WEB FEEDING MECHANISM

Filed Sept. 19, 1955

INVENTOR.
RALPH E. MONTIJO, JR.
BY Morris A. Rabkin
ATTORNEY.

United States Patent Office 2,788,209

Patented Apr. 9, 1957

2,788,209

WEB FEEDING MECHANISM

Ralph E. Montijo, Jr., West Collingswood, N. J., assignor to Radio Corporation of America, a corporation of Delaware Application September 19, 1955, Serial No. 535,075

5 Claims. (Cl. 271—2.3)

This invention relates to a web feeding mechanism, and more particularly to means for providing a high speed start-stop arrangement for a web member which may comprise a magnetic record tape.

Magnetic recording tapes have come into use in the field of high speed computing devices. In certain phases of the operation of such devices it becomes necessary for a magnetic record tape to be rapidly started and stopped in accordance with demand information. It is essential that the starting and stopping time for the record member be as small as possible. The usual starting and stopping apparatus requires that various driving rollers or capstans be first brought up to speed before the record member itself can achieve the desired speed. This means that the inertia of the various rollers and capstans must be overcome in order to achieve the desired speed. The inertia of these elements imposes sufficient load on the driving system to impede the accuracy of the registration of the signals recorded on the tape.

Accordingly, it is an object of the present invention to provide a novel web driving system for web members, such, for example, as magnetic record tapes, wherein the only inertia to be overcome in the starting of the tape is the inertia of the tape itself.

It is another object of the present invention to provide a web driving system for web members as set forth wherein a capstan and pressure roller web driving means are characterized in facility of operation and convenience of maintenance.

In accomplishing these and other objects, there has been provided in accordance with the present invention a constantly rotating capstan about which a tape is loosely wrapped. The tape is to be restrained against the possibility of motion being imparted to it by frictional engagement with the periphery of the capstan. The means for imposing this restraint is to be instantaneously releasable when the mechanism of the present invention is to be called into play to overcome only the inertia of the tape whereby tape acceleration is practically instantaneous. The capstan has a pair of circumferential ridges. An adjacent pressure roller is provided with a pair of grooves which are complementary to the ridges on the capstan. A resilient sleeve encompasses the pressure roller and bridges the grooves. The ridges of the capstan engage the surface of the resilient sleeve, which is held out of contact with the surface of the tape by the ridges, and is driven at the peripheral velocity of the capstan. To drive the tape, the axis of the pressure roller is shifted to cause the surface of the resilient sleeve to compress the tape against the body of the capstan, the portion of the resilient sleeve which brides the grooves being depressed into the grooves by the aforesaid ridges.

A better understanding of the present invention may be had from the following detailed description when read in connection with the accompany drawing in which.

Figure 1:
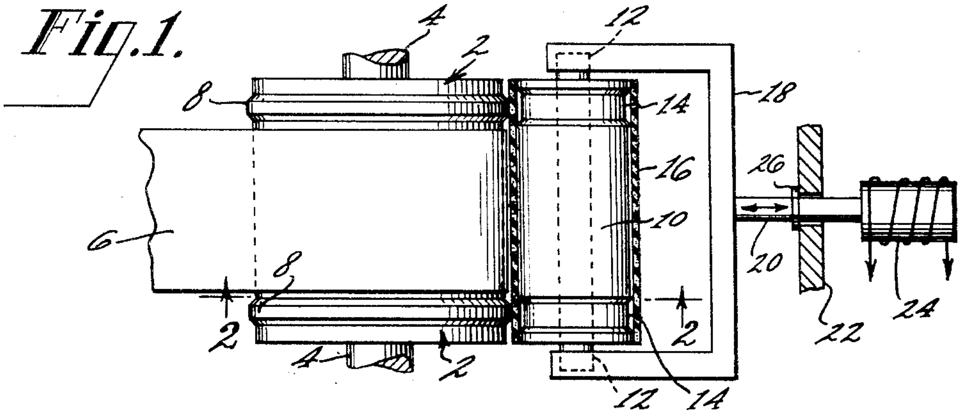
Fig. 1 is a top plan view, partly in section, of a portion of a web driving system constructed in accordance with the present invention and shown in the non-driving condition.

Referring now to the drawing in more detail, a portion of a magnetic record driving system is shown which comprises a capstan 2 mounted on a shaft 4. The capstan 2 is generally cylindrical in shape and is of a length greater than the width of the web member, or tape 6, which is to be driven. A pair of rigid rims or ridges 8 extend about the circumference of the cylindrical surface of the capstan. They are spaced apart a sufficient amount to permit the tape or web 6 to be accommodated by the capstan between the two rims or ridges and are of a height greater than the thickness of the web member 6. The capstan 2, as well as the ridges 8 formed thereon, may be made of a suitable metal such, for example, as stainless steel. The shaft 4 of the capstan is connected to a suitable driving means (not shown) which is adapted to drive the capstan at a desired constant speed.

Positioned adjacent to the capstan 2 is a pressure roller member 10 which is mounted on a shaft 12. The axis of the pressure roller 10 is parallel to the axis of the capstan 2. The pressure roller is also generally cylindrical in shape and is substantially coextensive with the capstan. It is provided with a pair of peripheral grooves 14 which encircle the cylindrical surface. These grooves are positioned on the pressure roller to lie substantially opposite the rims or ridges 8 on the capstan. A resilient sleeve 16 is positioned on the outer surface of the pressure roller and is substantially coextensive therewith. This resilient sleeve, which may be made of rubber or a rubber-like plastic, bridges the grooves 14. The shaft 12 of the pressure roller is carried by a yoke member 18 which is, in turn, mounted on a driving rod 20. The driving rod 20 extends through a suitable bracket 22 and is coupled to a driving solenoid 24. In order to assure that the rims or ridges 8 of the capstan remain in driving contact with the surface of the sleeve 16, suitable stop means are provided which prevents the capstan and the pressure roller from being completely separated. This stop means is represented as being a collar 26 on the shaft 20 which butts against the bracket 22 when the roller is in the open position shown in Figs. 1 and 2.

In operation, a web member 6 is positioned loosely on the capstan 2 between the two ridges 8. The web member 6 is restrained against inadvertent forward motion, through loose frictional engagement with the capstan, by a restraining mechanism represented schematically by a backing member 29, a brake member 28 and a brake operating solenoid 30. A spring 32, reacting against a bracket 27, normally holds the brake in engagement with the tape or web 6. Whenever the solenoid 24 is energized to operate the web driving means, the solenoid 30 is energized to simultaneously disengage the brake 28. The pressure roller is positioned adjacent the capstan in the manner shown in Figs. 1 and 2. The resilient sleeve member 16 does not engage the surface of the web or tape 6. However, at the point where the sleeve bridges the grooves in the presure roller, the sleeve is engaged by the ridges 8 on the capstan 2. Thus, with the tape loosely carried about the capstan, rotation of the capstan does not cause the tape to be advanced. On the other hand, the engagement of the rims 8 on the capstan 2 causes the pressure roller to be driven at substantially the peripheral velocity of the capstan.

Figures 2, 3, 4:
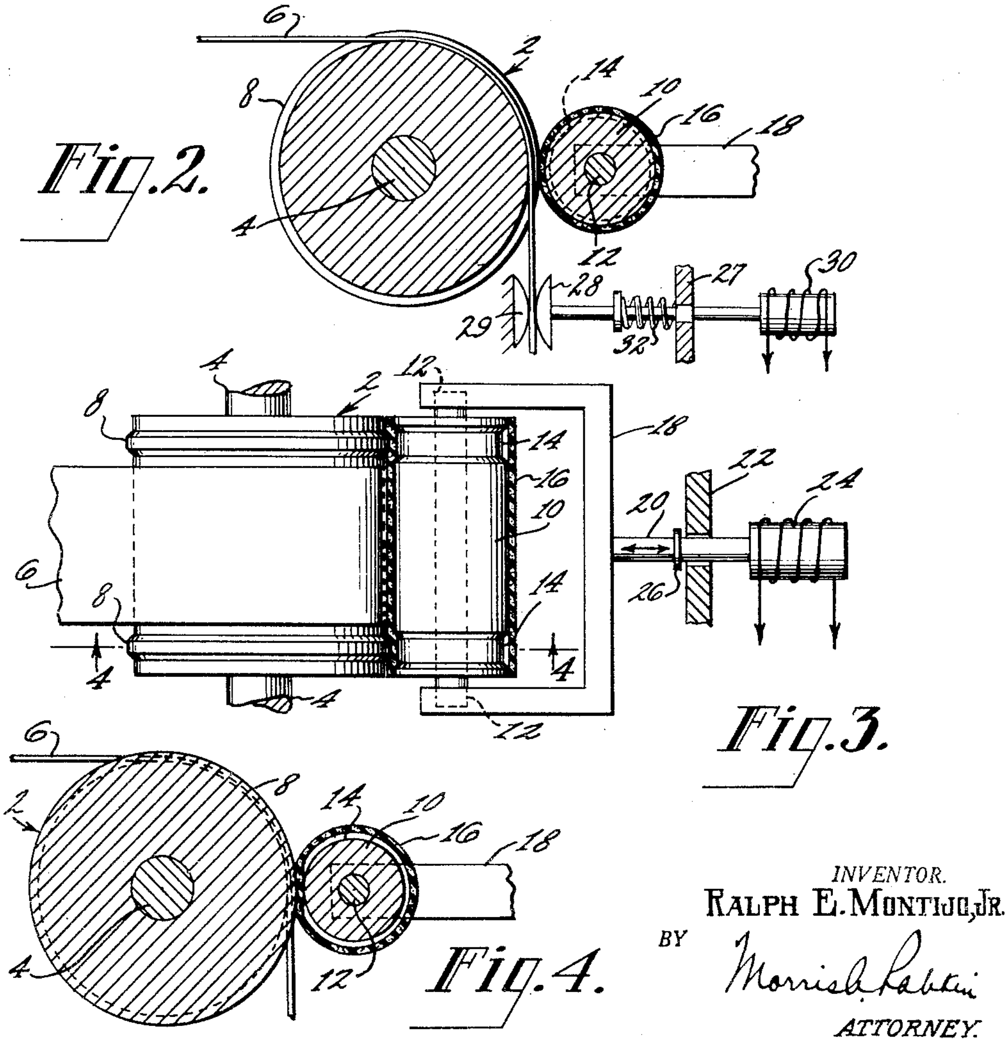
Fig. 2 is a cross sectional view taken along the line 2—2 of Fig. 1 as viewed in the direction of the appended arrows.
Fig. 3 is a view similar to that shown in Fig. 1 but with the apparatus conditioned to drive the web.
Fig. 4 is a cross sectional view taken along the line 4—4 of Fig. 3 as viewed in the direction of the appended arrows.

When it is desired to cause the tape to be advanced, the solenoid 24 is energized causing the axis of the pressure roller to be moved slightly toward the axis of the capstan. When the axis of the pressure roller is thus shifted, the hard or rigid ridges 8 on the capstan causes the resilient sleeve 16 on the pressure roller to be depressed into the grooves 14 as shown in Figs. 3 and 4. The portion of the sleeve 16 which lies between the two grooves is brought into engagement with the surface of the web member 6 causing the tape to be driven by the capstan. Since the only inertia which must be overcome is that of the tape, which is negligible, the starting of the tape is practically instantaneous. The pressure roller and the brake 28 is moved back to the position shown in Fig. 2 when the motion of the tape is to be stopped. Throughout the starting and stopping operation of the tape there is no interruption or appreciable change in velocity of the rotational motion of the capstan and of the pressure roller. When after a period of time and a number of start-stop operations the sleeve member becomes worn, particularly in the vicinity of the grooves 14, it is a relatively simple matter to peel off the worn sleeve and replace it with a new one.

Thus, there has been provided an improved web or tape driving means which is characterized in that the tape may be instantly started without the necessity of overcoming the inertia of the relatively massive driving means. and in that the apparatus is economical in structure, operation and maintenance.

What is claimed is:

1. In a web driving system, restraining means for preventing movement of web, a capstan, a pressure roller positioned adjacent and parallel to said capstan, said capstan including a generally cylindrical body and a pair of rigid ridges about the periphery thereof, said ridges being spaced to straddle a web member, said pressure roller including a generally cylindrical body and a pair of circumferential grooves thereabout, said grooves being spaced to be in alignment with said ridges on said capstan, a resilient sleeve on said pressure roller bridging said grooves, means for supporting said pressure roller with said ridges in frictional driving contact with that portion of said sleeve bridging said grooves, said sleeve being spaced from said cylindrical body of said capstan to receive a web member loosely therebetween, means for shifting said pressure roller toward said capstan whereby to depress said sleeve into said grooves by said ridges and to pinch said web member between said cylindrical body of said capstan and said sleeve, and means for releasing said restraining means operatively connected for simultaneous operation with said pressure roller shifting means.

2. In a web driving system, a capstan, a pressure roller positioned adjacent and parallel to said capstan, said capstan including a generally cylindrical body and a pair of rigid ridges about the periphery thereof, said ridges being spaced to straddle a web member, said pressure roller including a generally cylindrical body and a pair of circumferential grooves thereabout, said grooves being spaced to be in alignment with said ridges on said capstan, a soft rubber sleeve on said pressure roller bridging said grooves, means for supporting said pressure roller with said ridges in frictional driving contact with that portion of said sleeve bridging said grooves, said sleeve being spaced from said cylindrical body of said capstan to receive a web member loosely therebetween, and means for shifting said pressure roller toward said capstan whereby to depress said rubber sleeve into said grooves by said ridges and to pinch said web member between said cylindrical body of said capstan and said sleeve.

3. In a web driving system, a capstan, a pressure roller positioned adjacent and parallel to said capstan, said capstan including a generally cylindrical body and a pair of rigid ridges about the periphery thereof, said ridges being spaced to straddle a web member, said pressure roller including a generally cylindrical body and a pair of circumferential grooves thereabout, said grooves being spaced to be in alignment with said ridges on said capstan, a soft rubber sleeve on said pressure roller bridging said grooves, means for supporting said pressure roller with said ridges in frictional driving contact with that portion of said sleeve bridging said grooves, said sleeve being spaced from said cylindrical body of said capstan to receive a web member loosely therebetween, and solenoid means for shifting said pressure roller toward said capstan whereby to depress said rubber sleeve into said grooves by said ridges and to pinch said web member between said cylindrical body of said capstan and said sleeve.

4. In a web driving system, a capstan, a pressure roller positioned adjacent and parallel to said capstan, said capstan including a generally cylindrical body and a pair of rigid ridges about the periphery thereof, said ridges being spaced to straddle a web member, said pressure roller including a generally cylindrical body and a pair of circumferential grooves thereabout, said grooves being spaced to be in alignment with said ridges on said capstan, a soft rubber sleeve surrounding said pressure roller and bridging said grooves, means for supporting said pressure roller with said ridges in frictional driving contact with that portion of said rubber sleeve bridging said grooves, said sleeve being spaced from said cylindrical body of said capstan to receive a web member therebetween, solenoid means for shifting said pressure roller toward said capstan whereby to depress said rubber sleeve into said grooves by said ridge and to pinch said web member between said cylindrical body of said capstan and said sleeve, and stop means positioned to limit the movement of said pressure roller in a direction away from said capstan whereby to maintain said frictional driving contact between said ridge and said sleeve.

5. In a web driving system, a pair of members, said members being circular in cross section, one of said members being a capstan and the other of said members being a pressure roller, one of said members having a pair of rigid ridges about the periphery thereof, said ridges being spaced from each other to permit a web member to be disposed therebetween, the other of said members having a pair of circumferential portions of reduced diameter, said portions of reduced diameter being spaced from each other to be opposite said ridges, resilient sleeve means located on said member having said portions of reduced diameter and surrounding said portions of reduced diameter, means for supporting said members with said ridges in frictional driving contact with the portions of said sleeve means over said portions of reduced diameter, said supporting means maintaining said members spaced from each other to receive a web member therebetween, and means for shifting one of said members toward the other to depress said sleeve means into said portions of reduced diameter and to pinch said web member between said sleeve means and the portion of said rigid member between said spaced ridges.

References Cited in the file of this patent

UNITED STATES PATENTS

| | | |
|---|---|---|
| 2,704,639 | Shields | Mar. 22, 1955 |

FOREIGN PATENTS

| | | |
|---|---|---|
| 1,102,564 | France | May 11, 1955 |